US008148832B2

(12) United States Patent
Cripps

(10) Patent No.: US 8,148,832 B2
(45) Date of Patent: *Apr. 3, 2012

(54) ELECTRIC POWER GENERATING SYSTEM

(76) Inventor: Jeffrey L. Cripps, Waterford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,593

(22) Filed: Oct. 11, 2010

(65) Prior Publication Data
US 2011/0025056 A1    Feb. 3, 2011

Related U.S. Application Data

(63) Continuation of application No. 11/956,529, filed on Dec. 14, 2007, now Pat. No. 7,834,471.

(51) Int. Cl.
*F02B 63/04* (2006.01)
*F02B 67/04* (2006.01)
(52) U.S. Cl. ....................................... 290/1 E
(58) Field of Classification Search .............. 290/1 E
See application file for complete search history.

(56) References Cited

U.S. PATENT DOCUMENTS

| 2,524,005 | A | * | 9/1950 | Boe | 290/1 E |
|---|---|---|---|---|---|
| 3,732,949 | A | * | 5/1973 | Williams | 185/40 R |
| 3,800,212 | A | * | 3/1974 | Branco et al. | 322/28 |
| 4,020,923 | A | * | 5/1977 | Taylor | 185/11 |
| 4,228,360 | A | * | 10/1980 | Navarro | 290/43 |
| 4,287,428 | A | * | 9/1981 | Smith | 290/1 E |
| 4,418,286 | A | * | 11/1983 | Scott | 290/42 |
| 4,476,853 | A | * | 10/1984 | Arbogast | 126/578 |
| 4,610,140 | A | * | 9/1986 | Thompson, Jr. | 60/506 |
| 4,612,768 | A | * | 9/1986 | Thompson, Jr. | 60/506 |
| 5,590,741 | A | * | 1/1997 | Storms | 185/10 |
| 5,880,532 | A | * | 3/1999 | Stopher | 290/1 E |
| 5,909,784 | A | * | 6/1999 | Best | 185/10 |
| 5,917,310 | A | * | 6/1999 | Baylis | 322/1 |
| 5,929,531 | A | * | 7/1999 | Lagno | 290/53 |
| 6,199,664 | B1 | * | 3/2001 | Tkaczyk et al. | 185/39 |
| 6,236,118 | B1 | * | 5/2001 | Vasija et al. | 290/1 E |
| 6,291,900 | B1 | * | 9/2001 | Tiemann et al. | 290/1 A |
| 6,359,800 | B1 | * | 3/2002 | Liang et al. | 363/70 |
| 6,798,080 | B1 | * | 9/2004 | Baarman et al. | 290/43 |
| 6,825,574 | B1 | * | 11/2004 | Mooring | 290/1 R |
| 6,885,114 | B2 | * | 4/2005 | Baarman et al. | 290/43 |
| 6,927,501 | B2 | * | 8/2005 | Baarman et al. | 290/43 |
| 7,009,350 | B1 | * | 3/2006 | Gold | 318/142 |
| 7,067,936 | B2 | * | 6/2006 | Baarman et al. | 290/43 |
| 7,129,592 | B1 | * | 10/2006 | Yetter | 290/1 A |
| 7,205,732 | B1 | * | 4/2007 | Gold | 318/142 |
| 7,231,874 | B2 | * | 6/2007 | Rastegar et al. | 102/207 |
| 7,233,078 | B2 | * | 6/2007 | Baarman et al. | 290/43 |
| 7,365,445 | B2 | * | 4/2008 | Burcik | 290/53 |
| 7,445,606 | B2 | * | 11/2008 | Rastegar et al. | 601/5 |

(Continued)

*Primary Examiner* — Pedro J Cuevas
(74) *Attorney, Agent, or Firm* — Garlick & Markison; Bruce E. Stuckman

(57) ABSTRACT

An electrical power generating system includes a spring system that stores stored energy, the spring system having an input for recharging the stored energy and an output for releasing the stored energy, wherein the spring system generates a monitor signal based on a status parameter of the spring system and wherein the spring system releases the stored energy in accordance with an output control signal. A generator converts the stored energy released by the spring system into electric power. A spring recharge module recharges the stored energy of the spring system in response to a recharge control signal, based on a supplemental source of power. A control module generates the recharge control signal and the output control signal, based on the monitor signal.

11 Claims, 3 Drawing Sheets

U.S. PATENT DOCUMENTS

| | | | |
|---|---|---|---|
| 7,462,945 B2* | 12/2008 | Baarman et al. | 290/43 |
| 7,492,120 B2* | 2/2009 | Benn et al. | 320/101 |
| 7,605,482 B2* | 10/2009 | Brown et al. | 290/1 R |
| 7,626,279 B2* | 12/2009 | Brown et al. | 290/1 R |
| 7,645,246 B2* | 1/2010 | Rastegar et al. | 601/5 |
| 7,834,471 B2* | 11/2010 | Cripps | 290/1 E |
| 8,030,786 B2* | 10/2011 | Jackson et al. | 290/1 R |
| 8,062,237 B2* | 11/2011 | Rastegar et al. | 601/5 |
| 2002/0180404 A1* | 12/2002 | Benn et al. | 320/101 |
| 2003/0041767 A1* | 3/2003 | Rastegar et al. | 102/207 |
| 2003/0042807 A1* | 3/2003 | Blake | 310/66 |
| 2004/0195840 A1* | 10/2004 | Baarman et al. | 290/43 |
| 2005/0077732 A1* | 4/2005 | Baarman et al. | 290/54 |
| 2005/0161949 A1* | 7/2005 | Baarman et al. | 290/43 |
| 2005/0189769 A1* | 9/2005 | Baarman et al. | 290/43 |
| 2005/0189770 A1* | 9/2005 | Baarman et al. | 290/43 |
| 2006/0046907 A1* | 3/2006 | Rastegar et al. | 482/91 |
| 2006/0046908 A1* | 3/2006 | Rastegar et al. | 482/91 |
| 2006/0046909 A1* | 3/2006 | Rastegar et al. | 482/91 |
| 2006/0046910 A1* | 3/2006 | Rastegar et al. | 482/91 |
| 2007/0120368 A1* | 5/2007 | Baarman et al. | 290/43 |
| 2008/0061557 A1* | 3/2008 | Baarman et al. | 290/54 |
| 2008/0061558 A1* | 3/2008 | Baarman et al. | 290/54 |
| 2008/0067813 A1* | 3/2008 | Baarman et al. | 290/43 |
| 2008/0116147 A1* | 5/2008 | Baarman et al. | 210/748 |
| 2008/0136191 A1* | 6/2008 | Baarman et al. | 290/54 |
| 2009/0152867 A1* | 6/2009 | Cripps | 290/42 |
| 2009/0278355 A1* | 11/2009 | Baarman et al. | 290/52 |
| 2010/0160121 A1* | 6/2010 | Rastegar et al. | 482/91 |
| 2010/0160122 A1* | 6/2010 | Rastegar et al. | 482/91 |
| 2010/0258020 A1* | 10/2010 | Rastegar et al. | 102/209 |
| 2011/0101702 A1* | 5/2011 | Williams | 290/1 E |
| 2011/0127777 A1* | 6/2011 | Fielder | 290/1 E |
| 2011/0198143 A1* | 8/2011 | Gravino | 180/165 |
| 2011/0271850 A1* | 11/2011 | Doyle et al. | 100/8 |

* cited by examiner

ELECTRIC POWER GENERATING SYSTEM

CROSS-REFERENCE TO PRIORITY APPLICATION

The present U.S. Utility Patent Application claims priority pursuant to 35 U.S.C. §120, as a continuation, to U.S. Utility application Ser. No. 11/956,529 now U.S. Pat. No. 7,834,471, entitled "SELF-SUSTAINING ELECTRIC POWER GENERATING SYSTEM," filed Dec. 14, 2007 now U.S. Pat. No. 7,834,471, which is hereby incorporated herein by reference in its entirety and made part of the present U.S. Utility Patent Application for all purposes.

BACKGROUND OF THE INVENTION

1. Technical Field of the Invention

This invention relates to an improved system for generating electrical power utilizing a spring as the energy source for generating electrical power.

2. Description of Related Art

Conventional electrical power generating systems which use fossil and non-fossil fuels have adverse affects on the environment. For example, electrical power-generating systems that utilize fossil fuels, such as coal or oil, produce residual materials which pollute the atmosphere. Those pollutants result from the burning of fossil fuels to generate heat to produce steam which operates turbines that drive electrical power-producing generators. Other electrical power-generating systems which utilized atomic energy to produce steam cause radiation problems in the disposal of spent radioactive fuel. Hydro-electric power systems require expensive and elaborate structures, such as dams, which block rivers, and water storage ponds or lakes, which can adversely impact the environment. Wind-operated systems, which use numerous windmills, are not practical in many places because they require large areas and steady winds. Also when used alone, windmills have limited application unless areas have sufficient, consistent wind velocity and wind strength. Hence, efforts have been made to develop systems for generating electricity that eliminate or minimize the disturbance of the environment and the high expenses and ecological problems associated with conventional power-generating systems.

BRIEF SUMMARY OF THE INVENTION

The present invention is directed to systems and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
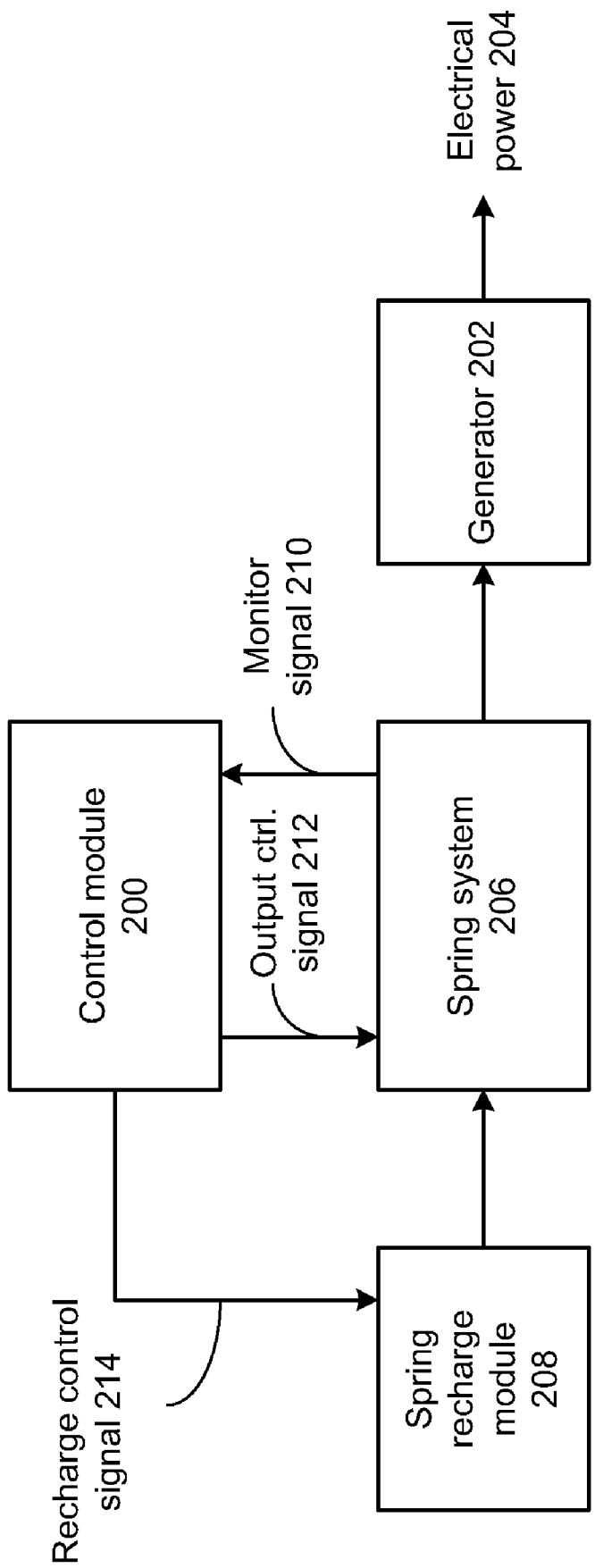
FIG. 1 presents a block diagram representation of a self-sustaining electrical power generating system in accordance with an embodiment of the present invention.

The invention herein contemplates an economical way to produce electrical energy without adversely impacting the environment, without utilizing fossil fuels, and without the need to construct large structures such as dams or water retention lakes, and the like.

The invention herein is concerned with providing the "fuel" or energy source for operating electrical generators on a consistent basis using the mechanical force of metals that are formed into different shapes thru various processes, that become energy storage devices, such as springs. Springs are available in various configurations and can be constructed with various types of metal. When a spring is coiled, compressed or otherwise put under stress in a charging or recharging process, this stress or torsional force can be released and converted to electric power.

The power generated by the system of the present invention can be used as primary or supplemental power supply sources, for either mobile or established power-generating systems. Thus, the primary power is particularly useful in generating reliable, ecologically sound and cost efficient electric energy, in areas that do not have existing power providers. When the system is used for a supplemental power supply it can provide electric energy during peak times when extra power is demanded from established or local electrical power generating installations. This can reduce the need for peaking power plants.

The amount of electricity generated can be varied. For example, when installed in homes and businesses, the present invention can meet on-site energy demands, with excess energy being dispersed to transmission lines in order to provide sufficient electrical power to augment or supplement a conventional electrical power-generating system of a particular community or area. Thus, this system can be operated during peak hours of the electrical power demand. During non-peak periods the system can be either shut down or operated to reduce the power output of convention electrical power generation systems optionally used in conjunction therewith. This system can meet some or all of the power demands of a building, site or a community based on the scale of the implementation, providing a clean source of electrical power.

In accordance with an embodiment of the present invention, a "point of use system" is provided. By generating electric power close to the point of use under voltage issues can be eliminated and the energy demanded from our aging electrical infrastructure can be reduced. The system can be turned on or off quickly, on short notice, for either supplying, or discontinuing supplying, electrical power without disrupting the existing electrical systems. Moreover, the system adds relatively little by way of structure so that the system can be constructed in a fashion that is neither unsightly nor ecologically unacceptable to environmentally conscious consumers and communities.

Yet another advantage of the invention is to provide a relatively easily and inexpensive mobile power system that can be set up quickly and have the ability to meet the electric energy demands of a home, area or emergency zone.

FIG. 1 presents a block diagram representation of a self-sustaining electrical power generating system in accordance with an embodiment of the present invention. In particular, a self-sustaining electrical power generating system is shown that includes a spring system 206 that stores stored energy in a spring such as by either a torsional or translational displacement. The spring system 206 has an input for recharging the stored energy and an output for releasing the stored energy. The spring system 206 includes one or more sensors that generate a monitor signal 210 based on a status parameter of the spring system 206, such as a torque, rotational velocity, strain, stress, or other operating parameter of the spring system 206. In operation, the spring system 206 releases the stored energy in response to an output control signal 212 generated by control module 200 in response to the monitor signal 210.

A generator 202 is coupled to the output of the spring system 206 for converting the stored energy of the spring system into electric power. In an embodiment of the present invention, the output of spring system 206 includes a drive shaft that drives the generator 202 at a rotational velocity. In this embodiment, the monitor signal 210 indicates the rotation velocity of the drive shaft and the control module 200 controls the rotation velocity of the drive shaft to a substantially constant value such as +/−10%, +/−5%, or to some greater or lesser variation to provide a relatively stable source of electric power 204, based on constant power constraints of the implementation of the self-sustaining power generating system, if any. In particular, when the velocity of the drive shaft exceeds a velocity threshold, control module 200 can generate output control signal 212 to slow down the drive shaft.

A spring recharge module 208 is coupled to the input of the spring system 206 for recharging the stored energy of the spring system in response to a recharge control signal 214. In operation, the control module 200 can determine, based on the monitor signal 210, when the stored energy of spring system 206 is running low, for instance, based on a low output velocity, low strain, or other parameter. In this circumstance, the control module 200 can command the spring recharge module 208 to recharge the spring, such as by automatically winding it up, providing additional translational displacement, etc.

In an embodiment of the present invention, the spring recharge module 208 operates by capturing one or more renewable energy resources as electric power and storing the electric power in a battery or other storage device. When recharging is commanded via the recharge control signal 214, the stored electrical energy can be converted to torsional or translation energy via a motor, gears and/or other drivers used to drive the input of the spring system 206. For instance, the spring recharge module 208 can include a solar panel that converts solar energy to electric power, a wind generator that converts wind energy to electric power, a geothermal system that converts geothermal energy to electric power, a hydroelectric system that converts water power to electric power, a tidal system that converts tidal energy to electric power or other renewable energy system that converts renewable energy to electric power. In addition, the present invention can operate as either a primary energy system or energy storage system in conjunction with a waste-water power generation system that converts waster-water flow to electric power such as described in U.S. patent application Ser. No. 11/201,074, entitled "Waste Water Electrical Power Generating System," filed on Aug. 10, 2005, or "U.S. patent application entitled Waste Water Electrical Power Generating System With Storage System and Methods for Use Therewith," filed on Oct. 30, 2007, the contents of which are incorporated herein by reference. For example, a waste water power generation system can provide the renewable energy, via conversion of waste-water flow to electric power, that can be used to recharge the spring system 206. In addition, the present invention, operated with or without other renewable energy sources, can be used as a supplemental energy source and/or storage subsystem to a waste water electric power generating system.

In a further embodiment of the present invention, the spring recharge module 208 includes a regeneration module, such as a regenerative braking system that, in circumstances when the output drive shaft of the spring system 206 is running at a higher than desired velocity, brakes the output drive shaft electromagnetically and generates further electrical energy that can be stored in a battery or other storage device. In this fashion, spring recharge module 208 can recharge the stored energy of spring system 206, at least in part, based on at least a portion of the released stored energy derived from the output drive shaft. In accordance with this embodiment, control module 200 generates output control signal 212 to apply the regenerative braking system in response to a value of monitor signal 210 indicating a greater than desired velocity.

In an embodiment of the present invention, control module 200 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the control module 200 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In particular, control module 200 can include a look-up table, algorithm or other instructions that determine recharge control signal 214 and output control signal 212 based on the value or values of monitor signal 210.

Figure 2:
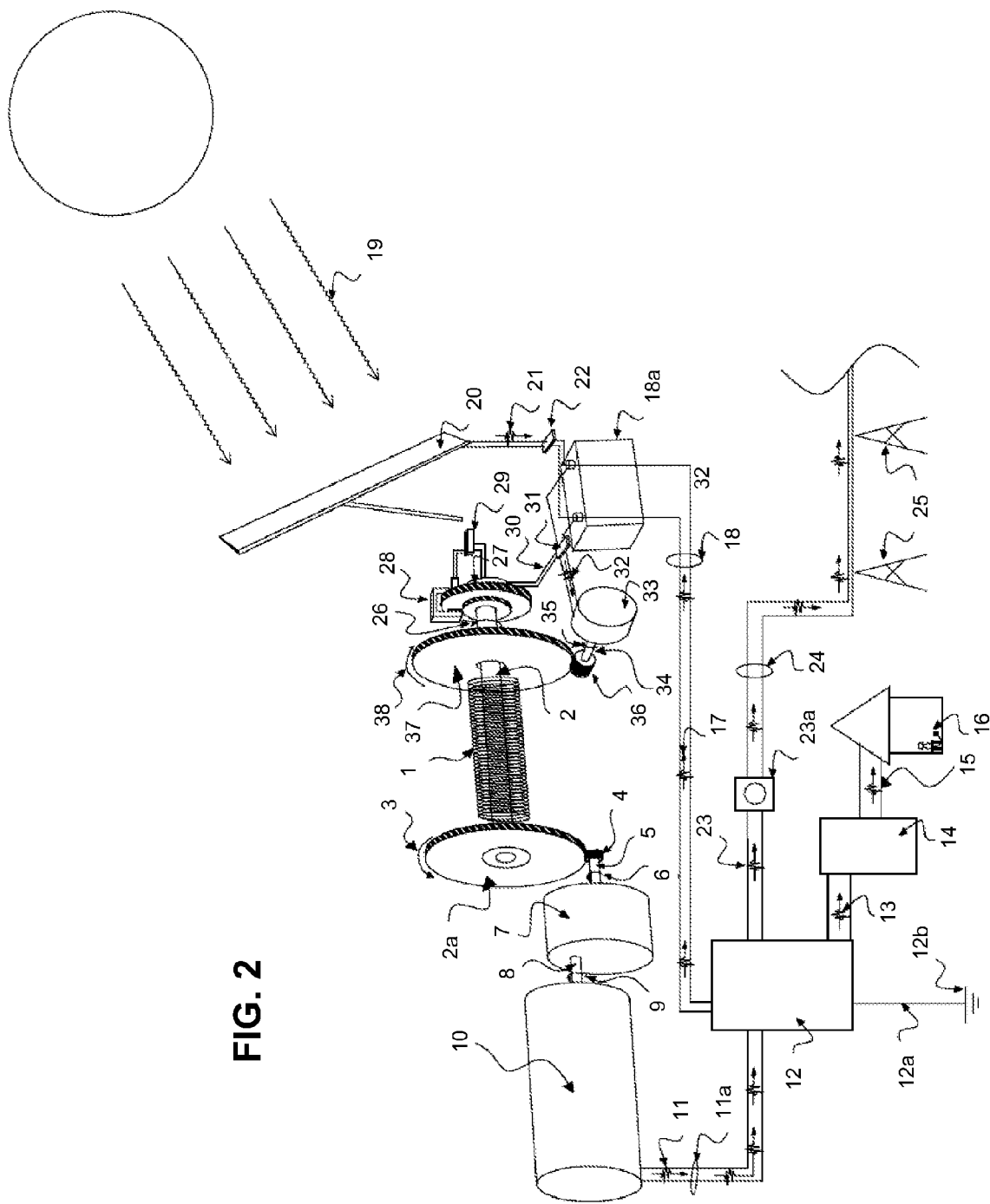
FIG. 2 schematically illustrates, in profile view, a system for converting mechanical energy in to usable electric energy in accordance with an embodiment of the present invention.

FIG. 2 schematically illustrates, in profile view, a system for converting mechanical energy in to usable electric energy in accordance with an embodiment of the present invention. In this embodiment, spring storage system includes energy storage device 1, power drive gear 2a, gearing 4, gear box 7, power shaft 2, primary regenerating gear 37, disk rotor 27 and caliper 28. Spring recharge module 208 includes solar panel 20, energy storage device 18a, regenerating motor 33, control switch 31 and regeneration gear 36. Control module 200 includes control module 29.

The drawing schematically illustrates the energy storage device 1, shown, for example, as a torsional spring, that is attached to the regenerating gear 31 and power shaft 2. Power shaft 2 is, in turn, attached to the power drive gear 2a. As the torsional force is released it causes the power drive gear to move as indicated by arrow 3.

The generated torque is then increased by the use of gearing 4 and is transferred to the gearbox input shaft 5. As the torsional force is applied, it makes the gearbox input shaft 5 turn as indicated by arrow 6. The energy is then transferred within the gearbox 7 and in turn causes the gearbox output/generator input shaft 8 to begin to turn, as shown by arrow 9.

The transferred energy 9 is introduced to a conventional electric power generator 10, than converts the torsional energy into electric energy 11. The electric energy 11 is transmitted along conductor's 11a to a control/switch panel 12. The control/switch panel 12, is grounded using a sized conductor 12a and a sized grounding rod 12b. The electric energy is then transmitted along electric conductors 13 into a standard fuse panel 14. As the energy exits panel 14, it is transmitted along conductors 15 and into the user receptacles 16. The control/switch panel 12 also diverts energy to be used in other applications. The controller 22 is coupled to command the control/switch panel 12 to divert excess electric energy 17 along conductor 18 to be stored within the energy storage device 18a. The energy storage device includes an AC/DC converter for converting AC energy 17 into DC power suitable for charging the energy storage device 18a. Energy storage device 18a, shown as a battery, also receives and stores electric current that is captured from solar energy 19. The solar energy converter 20 processes and transmits electric current 21 to a controller 22 and stores it in the energy storage device 18a. When the other obligations have been met, the controller 22 is coupled to control/switch panel 12 optionally diverts excess energy 23 through the existing electric meter 23a along conductors 24 to the existing power transmission system 25.

In order to produce stable electric energy, the rotations per minute ("RPM") of the gearbox output/generator input shaft 8 should be constant or substantially constant; this motion is shown at its point of initiation by arrow 26 and generates a velocity signal, such as monitor signal 210, via a sensor such as a tachometer, optical disk or other sensor that is coupled to control module 29. The torsional force and/or excess velocity can be controlled by applying a frictional force (example: magnetic, friction pads, pneumatic, electromagnetic mechanical and hydraulically) on power shaft 2. This control force is schematically illustrated with a frictional control system.

The frictional control system consists of rams, cylinders, disk rotors, friction pads, pumps, sensors, computer control system, couplers, piping, reservoir, and various types of valves. This friction system operates as follows. the rotating force of the energy storage device 1 is transferred to the power shaft 2 (this motion is shown by arrow 26). This rotational energy is channeled to the disk rotor 27. Pressure is then applied through the use of hydraulic caliper 28. This caliper 28 is controlled via control module 29 based on the monitor signal 210 or input data from the other systems sensors not specifically shown.

As the control module 29 detects recharging is required via a low velocity of shaft 2, decreased spring strain, increased spring displacement, et cetera, a signal from control module 29, such as recharge control signal 214, is sent through conductor 30 to control switch 31. Control switch 31 then calls for the previously described stored energy in 18a. This energy is then transmitted through conductors 32 to the regenerating motor 33. As the regenerating motor is powered, it causes shaft 34 to begin rotation 35. Shaft 34 is connected to regenerating gear 36. Regeneration gear 36 is in contact to the primary regenerating gear 37 causing it to rotate 38 and in turn replacing the stored energy that has been used by rewinding the energy storage device 1.

As described above, the present invention uses a spring system, such as spring system 206, to store renewable energy for use in a power generation system. The spring system is configured to rewind itself using renewable energy, in use, creating a self-sustaining cycle.

Figure 3:
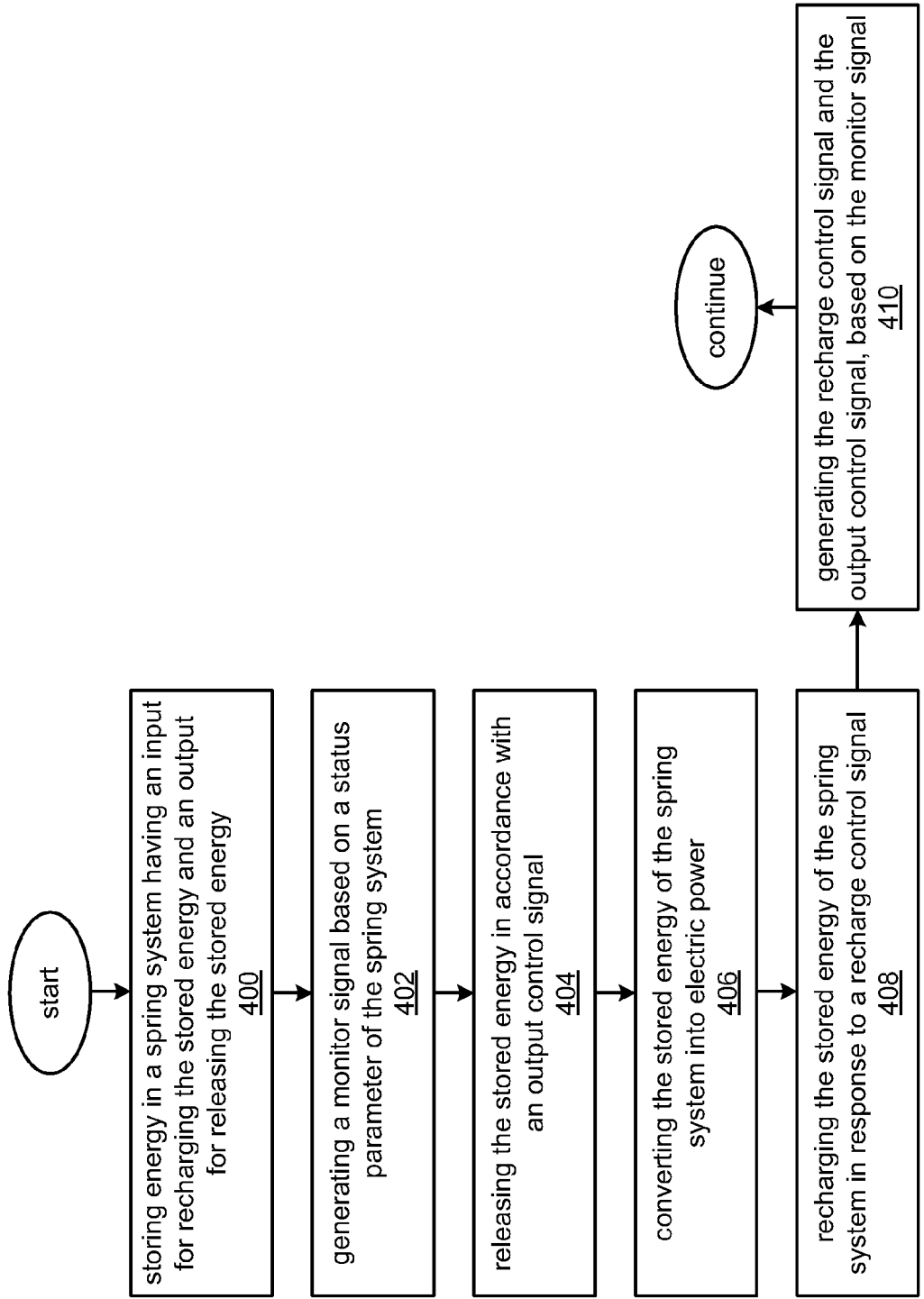
FIG. 3 presents a flowchart representation of a method in accordance with an embodiment of the present invention.

FIG. 3 presents a flowchart representation of a method in accordance with an embodiment of the present invention. In particular a method is shown that can be used in conjunction with one or more of the functions and features described in conjunction with FIGS. 1 and 2. In step 400, energy is stored in a spring system having an input for recharging the stored energy and an output for releasing the stored energy. In step 402, a monitor signal is generated based on a status parameter of the spring system. In step 404, the stored energy is released in accordance with an output control signal. In step 406, the stored energy of the spring system is converted into electric power. In step 408, the stored energy of the spring system is recharged in response to a recharge control signal. In step 410, the recharge control signal and the output control signal are generated, based on the monitor signal.

In an embodiment of the present invention, step 408 includes converting solar energy to electric power and/or converting wind energy or other form of renewable energy to electric power. Step 408 can also include storing electric power and driving the input of the spring system based on the stored electric power. In addition, step 408 can include recharging the stored energy based on at least a portion of the released stored energy.

In an embodiment of the present invention, the spring system output includes a drive shaft that drives a generator at a rotational velocity, wherein the monitor signal indicates the rotation velocity, and wherein the output control signal controls the rotation velocity to a substantially constant value.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, design considerations, system tolerances, etc. Such relativity between items ranges from a difference of a few percent to order of magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, power level, and type of signal. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by components, circuits, processors executing appropriate software, mechanical, hydraulic or other elements and the like or any combination thereof.

What is claimed is:

1. A power generating system comprising:
   a spring system that stores stored energy, the spring system having an input for recharging the stored energy and an output for releasing the stored energy, wherein the spring system includes a sensor that generates a monitor signal based on a status parameter of the spring system and wherein the spring system releases the stored energy in accordance with an output control signal;

a spring recharge module, coupled to the input of the spring system that includes means that operates based on input power from a supplemental energy source to recharge the stored energy of the spring system in response to a recharge control signal; and a control circuit, coupled to the spring system and the spring recharge unit, that generates the recharge control signal based on the monitor signal.

2. The power generating system of claim 1 wherein the supplemental energy source includes a solar panel that converts solar energy to the input power.

3. The power generating system of claim 1 wherein the supplemental energy source includes at least one of, a wind generator, a geothermal power system, a hydroelectric power system, and a tidal power system.

4. The power generating system of claim 1 wherein the supplemental energy source includes a waste water power generation system.

5. The power generating system of claim 1 wherein the spring recharge module includes a battery for storing the input power.

6. The power generating system of claim 1 wherein the spring system output includes a drive shaft that turns at a rotational velocity, wherein the monitor signal indicates the rotation velocity, and wherein the control module generates the output control signal to control the rotation velocity to a substantially constant value.

7. A method comprising:
storing energy in a spring system having an input for recharging the stored energy and an output for releasing the stored energy;

generating via a sensor, a monitor signal based on a status parameter of the spring system;

releasing the stored energy in accordance with an output control signal;

recharging the stored energy of the spring system m response to a recharge control signal, via a means that operates from an input power generated by a supplemental energy source; and generating via a control circuit, the recharge control signal, based on the monitor signal.

8. The method of claim 7 wherein recharging the stored energy of the spring system includes converting solar energy to the input power.

9. The method of claim 7 wherein recharging the stored energy of the spring system includes at least one of converting wind energy to the input power, converting waste water flow to the input power, converting water flow to the input power, converting geothermal energy to the input power, converting tidal energy to the input power.

10. The method of claim 7 wherein recharging the stored energy of the spring system includes storing the input power.

11. The method of claim 7 wherein the spring system output includes a drive shaft that turns at a rotational velocity, wherein the monitor signal indicates the rotation velocity, and wherein the output control signal is generated by the control circuit to control the rotation velocity to a substantially constant value.

* * * * *